United States Patent
Lin

(10) Patent No.: US 7,856,121 B2
(45) Date of Patent: Dec. 21, 2010

(54) IMAGE QUALIFICATION FOR OPTICAL NAVIGATION SENSOR

(75) Inventor: Chun-Huang Lin, Hsinchu (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 50 days.

(21) Appl. No.: 11/518,469

(22) Filed: Sep. 8, 2006

(65) Prior Publication Data

US 2007/0053552 A1   Mar. 8, 2007

Related U.S. Application Data

(63) Continuation of application No. 10/286,113, filed on Nov. 1, 2002, now Pat. No. 7,142,695.

(51) Int. Cl.
*G06K 9/00* (2006.01)
*H04N 7/18* (2006.01)
*H04N 11/02* (2006.01)
*H04N 11/04* (2006.01)
*H04N 7/12* (2006.01)
*H04N 5/14* (2006.01)
*H04N 9/64* (2006.01)

(52) U.S. Cl. ............... 382/107; 382/103; 348/154; 348/155; 348/400.1; 348/699

(58) Field of Classification Search .......... 382/107, 382/103; 348/154, 155, 400.1, 699–701
See application file for complete search history.

(56) References Cited

U.S. PATENT DOCUMENTS

| | | | | |
|---|---|---|---|---|
| 5,608,458 A * | 3/1997 | Chen et al. | ............ | 375/240.14 |
| 5,754,674 A * | 5/1998 | Ott et al. | ............ | 382/112 |
| 5,953,459 A * | 9/1999 | Ueda et al. | ............ | 382/237 |
| 6,081,551 A * | 6/2000 | Etoh | ............ | 375/240 |
| 6,438,254 B1 * | 8/2002 | Kadono et al. | ............ | 382/107 |
| 2002/0041702 A1 * | 4/2002 | Takeo et al. | ............ | 382/132 |
| 2002/0131647 A1 * | 9/2002 | Matthews | ............ | 382/268 |
| 2004/0008884 A1 * | 1/2004 | Simske et al. | ............ | 382/165 |
| 2004/0131231 A1 * | 7/2004 | Smilansky | ............ | 382/103 |

\* cited by examiner

*Primary Examiner*—Anand Bhatnagar
*Assistant Examiner*—Randolph Chu
(74) *Attorney, Agent, or Firm*—Tung & Associates

(57) ABSTRACT

An image qualification method. A movements-determining method utilizes the image qualification, the image qualification method of which requires only an image frame to determine if the image frame is qualified. Thus, the image qualification proceeds in real time. The image qualification counts peaks of images of the frame to determine if a number of the peaks exceed a certain number, depending on application.

7 Claims, 3 Drawing Sheets

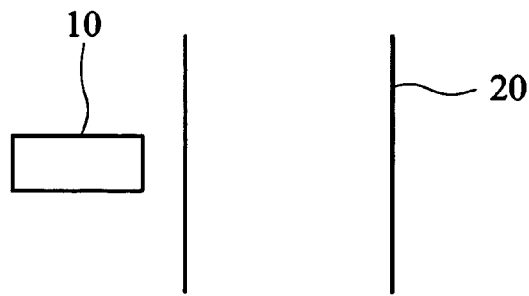 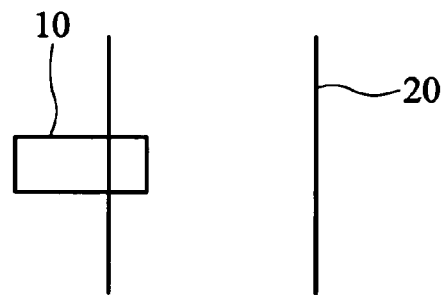
FIG. 2A         FIG. 2B
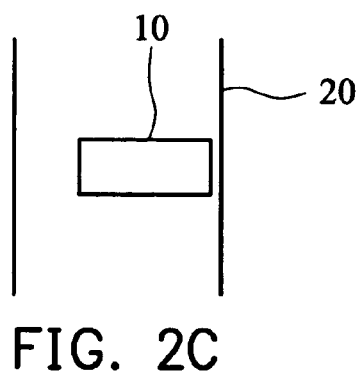 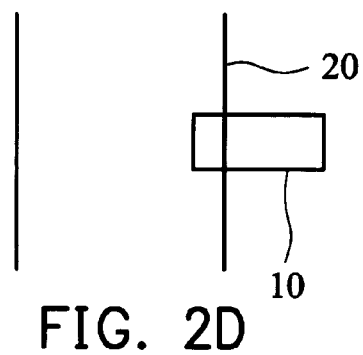
FIG. 2C         FIG. 2D
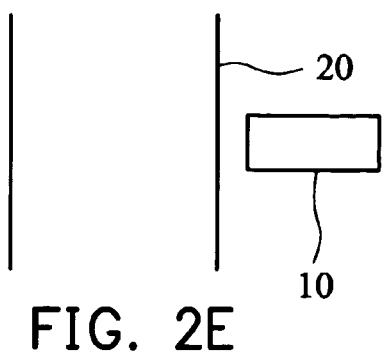
FIG. 2E

IMAGE QUALIFICATION FOR OPTICAL NAVIGATION SENSOR

This is a continuation of application(s) Ser. No. 10,286,113 filed on Nov. 1, 2002 now U.S. Pat. No. 7,142,695.

BACKGROUND OF THE INVENTION

1. Field of the Invention

The present invention relates to an image qualification method, and particularly to methods for optical navigation sensor.

2. Description of the Related Art

An optical navigation sensor determines movements by comparing correlation of images captured at different times. Thus, quality of image affects movements determined by the optical navigation sensor. The quality of image results from noise, blurring out of focus, illumination, etc. The LED (light emission diode) in the optical navigation sensor is constantly illuminated to prevent error in determining movements resulting from variation of illumination. When the optical navigation sensor is exposed to illumination from a fluorescent light driven by 60 Hz or 50 Hz AC power, however, there are periodical variations in illumination resulting in flickers in images captured by the optical navigation sensor and subsequent errors in determining movements.

The disadvantage of conventional image qualification is that several image frames are needed to calculate correlations there between to determine if the optical navigation is out of focus. Therefore, several buffers are required and time delay is unavoidable. There is a need to provide an image qualification for optical navigation sensor, which requires only an image frame.

SUMMARY OF THE INVENTION

It is therefore an object of the present invention to provide an image qualification in real time for an optical navigation sensor.

To achieve the above objects, the present invention provides an image qualification method, requiring only an image frame at once. The image qualification in the present invention includes the following steps.

A pixel in one dimension of a frame is determined to have an upper peak of brightness when pixels on two sides of the dimension have less brightness than the pixel.

A pixel in one dimension of the frame is determined to have a down peak of brightness when pixels on two sides of the dimension have more brightness than the pixel.

A pixel at an edge of one dimension of the frame is determined to have not an upper peak even when the pixel has a maximum brightness. A pixel at an edge of one dimension of the frame is determined to have not a down peak even when the pixel has a minimum brightness.

The frame is determined to be a good or bad frame based on the number of the peaks satisfies requirements.

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 2A to 2E shows diagrams for illustrating a flicker region by which the optical navigation sensor is affected.

DETAILED DESCRIPTION OF THE INVENTION

The present invention discloses an image qualification method, which requires only an image frame to determine whether the frame is qualified for determining movements without any buffer such that qualification proceeds in real time.

Figure 1A:
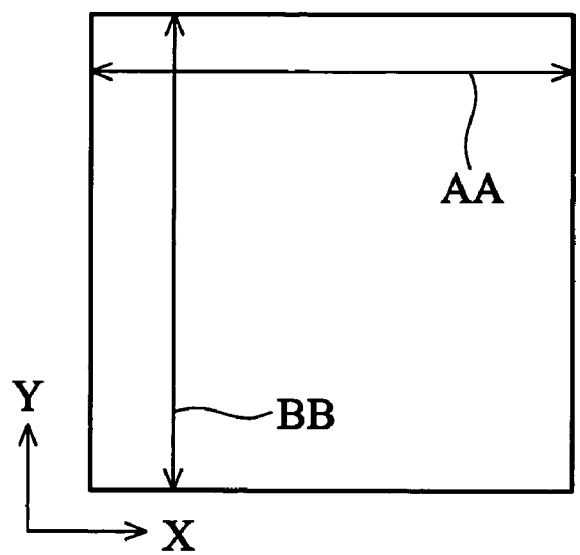
FIG. 1A shows a diagram for illustrating two dimensions of image sensor arrays.

FIG. 1A shows a diagram for illustrating two dimensions of image sensor array. In order to determine quality of a frame, one dimension of the image sensors pixels is taken for qualifying. For example, an image sensor array AA of one dimension in X direction is analyzed, and then all image sensor arrays in X direction are analyzed in the same way. An image sensor array BB of one dimension in Y direction is analyzed, and then all image sensor arrays in Y direction are analyzed in the same way.

Figure 1B:
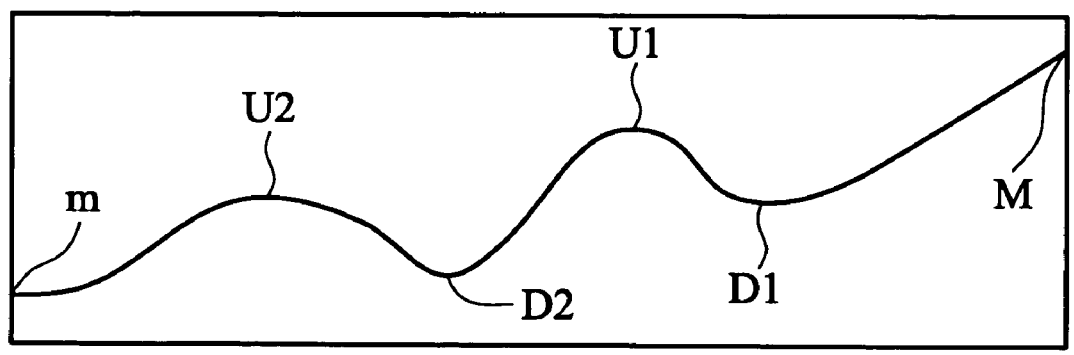
FIG. 1B shows a diagram for illustrating images captured by an image sensor array in one dimension.

FIG. 1B shows a diagram for illustrating images captured by an image sensor array in one dimension. The image sensor array in FIG. 1B can be in X or Y direction in FIG. 1A. FIG. 1B shows that there are variations in brightness of the image pixels in one dimension, i.e. there are local maximums in brightness.

The quality of images in one dimension is determined by the peaks of the brightness. There are two kinds of peaks defined in the present invention, as follows:

upper peak: a pixel in one dimension of a frame in which pixels on two sides of the dimension have less brightness than the pixel to some extent, such as U1, U2 shown in FIG. 1B.

down peak: a pixel in one dimension of a frame in which pixels on two sides of the dimension have more brightness than the pixel to some extent, such as D1, D2 shown in FIG. 1B. A pixel at an edge of one dimension of the frame, such as M in FIG. 1B, is not defined as an upper peak even when the pixel has a maximum brightness. A pixel which is at an edge of one dimension of the frame, such as m in FIG. 1B is not a down peak even when the pixel has a minimum brightness. The number of the upper peaks or of the down peaks can be counted as the number of the peaks of brightness in one dimension. When the number of the peak exceeds a critical number, the images in one dimension are defined qualified.

When an image frame in two dimensions had read by an optical navigation sensor, the number of the peaks in two dimensions was calculated completely. The number of the peaks in two dimensions, which satisfies requirements, depends on application. For example, it can be defined in many ways such as at least one column or one row satisfies requirements, or each column does, or each row does, then the image frame in two dimensions meets requirements and is defined as a good image frame. Otherwise, it is determined that the image frame does not meet requirements and is a bad image frame.

A good image frame is allowed to be used for motion estimation and evaluation of correlation to determine movements. A bad image frame is not allowed to be used for determining movements.

Another application follows. The good image frame is allowed to be used to determine movement, and movements determined by the good image frame are output. Movements determined by the bad image frame are not allowed to be output.

Another application is as follows. The good image frame is allowed to be used for determining movements, and movements determined by the good image frame are output. If movements is determined by the bad image frame, then predictive movements according to previous movements is output. When the optical navigation sensor is under a flicker region, movement errors result from the flicker region. The anti-flicker method disclosed in the present invention is based on the image qualification method to prevent movement errors.

FIG. 2A shows a diagram for illustrating a flicker region by which the optical navigation sensor is affected.

At time t1, an optical navigation sensor 10 has not entered a flicker region 20, such as a region illuminated by a fluorescent lamp light. An image frame captured by the optical navigation sensor 10 has NR1 rows of pixels, of which each row has a number of the peaks larger than a critical number NPX thereof. NR1 of the rows is larger than NRX. Thus, the quality of the image frame meets requirements. A second number of the image frames having the quality which meets requirements are counted such that the second number exceeds a second maximum Nmax2. Then, a first number of the image frames having the quality which does not meet requirements is reset, and this image is allowed to be used to determine movement.

FIG. 2B shows a diagram for illustrating a flicker region by which the optical navigation sensor is affected. At time t2, the optical navigation sensor 10 has a part of itself entered the flicker region 20. An image frame captured by the optical navigation sensor 10 has NR2 rows of pixels, of which each row has a number of the peaks larger than a critical number NPX of the peaks. NR2 of the rows is less than a number NRX. Thus, the quality of the image frame does not meet requirements. The first number of the image frames having the quality which does not meet requirements is counted such that the first number does not exceed a first maximum Nmax1. Then, movements are determined by the image frame.

FIG. 2C shows a diagram for illustrating a flicker region by which the optical navigation sensor is affected. At time t3, an optical navigation sensor 10 has entered the flicker region 20 completely. An image frame captured by the optical navigation sensor 10 has NR3 rows of pixels, each row with a number of the peaks larger than a critical number NPX of the peaks. NR3 of the rows is less than a number NRX. Thus, the quality of the image frame does not meet requirements. The first number of the image frames having the quality does not meet requirements is counted such that the first number exceeds the first maximum Nmax1. Then, the first number and the second number are both reset. The image frame is skipped. A new image frame is captured.

FIG. 2D shows a diagram for illustrating a flicker region by which the optical navigation sensor is affected. At time t4, an optical navigation sensor 10 has a part of itself left the flicker region 20. An image frame captured by the optical navigation sensor 10 has NR4 rows of pixels, of which each row has a number of the peaks larger than a critical number NPX of the peaks. NR4 of the rows is larger than NRX. Thus, the quality of the image frame meets requirements. The second number of the image frames having the quality meets requirements is counted such that the second number does not exceed the second maximum Nmax2. Then, the image frame is skipped. A new image frame is captured.

FIG. 2E shows a diagram for illustrating a flicker region by which the optical navigation sensor is affected. At time t5, an optical navigation sensor 10 had left the flicker region 20 completely. An image frame captured by the optical navigation sensor 10 has NR5 rows of pixels, of which each row has a number of the peaks larger than a critical number NPX of the peaks. NR5 of the rows larger than NRX. Thus, the quality of the image frame meets requirements. The second number of the image frames having the quality meeting requirements is counted such that the second number exceeds the second maximum Nmax2. Then, the first number is reset. Movements are determined by the image frame.

Figure 3:
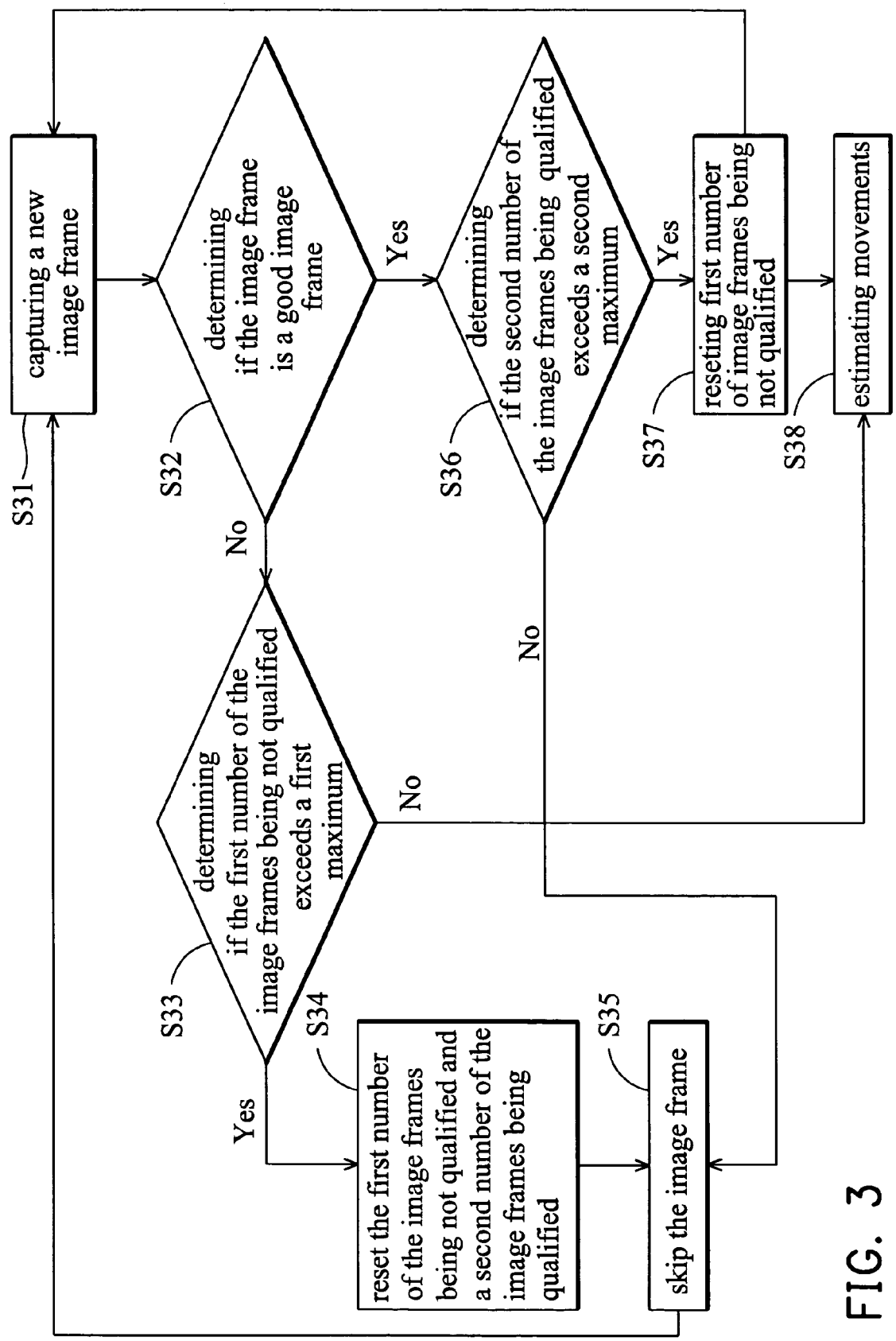
FIG. 3 shows a diagram for illustrating a flow chart of the anti-flicker method.

FIG. 3 shows a diagram for illustrating a flow chart of the anti-flicker method.

At step S31, an image frame is captured to determine the quality of the image.

At step S32, if the quality of the image frame meets requirements, the image frame is a good image frame, execution proceeds to step S36. If not, execution proceeds to step S33.

At step S33, a first number of the image frame not meeting requirements is accumulated. When the first number of the image frame having the quality not meeting requirements exceeds a first maximum Nmax1, execution proceeds to step S34. Otherwise, execution proceeds to step S38.

At step S34, a first counter counting the first number of the image frames having the quality not meeting requirements, is reset. A second counter counting the second number of the image frames, of which the quality meets requirements is reset.

At step S35, the image frame is skipped, and movements are not output. Process goes back to step S31.

At step S36, the quality of the image frame meets requirements, the second counter counts the second number of the image frame, of which the quality meets requirements. If the second number of the image frame having the quality meeting requirements, exceeds a second maximum Nmax2, execution proceeds to step 37, or execution goes back to step S35.

At step S37, the first counter is reset.

At step S38, movements of the optical navigation sensor are estimated by the image frame.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method executed by an optical navigation sensor to determine movements, comprising:
   receiving an image frame;
   determining by the optical navigation sensor whether a quality of said image frame meets a predetermined requirement by:
   determining whether a pixel is locally significantly different from its nearby pixels in a predetermined region;
   calculating the total number of pixels that are locally significantly different in said predetermined region; and
   determining whether said total number of said significantly different pixels in said region is larger than a critical number; and
   when said quality of said image frame meets the predetermined requirement, using said image frame to determine a movement; when said quality of said image frame does not meet the predetermined requirement, said image frame is not used to determine a movement, or said image frame is used to determine a movement, but the determined movement is not used for further processing.

2. The method according to claim 1, wherein when said quality of said image frame does not meet a predetermined requirement, said image frame is used to determine a movement, but the determined movement is overridden by a predictive movement determined from previous movements.

3. The method according to claim 1, wherein said predetermined region includes a one-dimensional array extending at least partially through a horizontal or vertical direction of said image frame.

4. The method according to claim 1, wherein a pixel is determined as a locally significantly different pixel when two pixels at two sides of said pixel are both brighter or both darker than said pixel.

5. An optical navigation device comprising:
a light emitting source; and
an optical navigation sensor for determining movements of said optical navigation device, said optical navigation sensor receiving an image frame resulting at least partially from light emitted from said light emitting source,
wherein said optical navigation sensor uses said image frame to determine a movement when a quality of said image frame meets a predetermined requirement that the total number of pixels which are locally significantly different from their nearby pixels in a predetermined region is larger than a critical number, and wherein said optical navigation sensor does not use said image frame to determine a movement when said quality of said image frame does not meet the predetermined requirement, or use said image frame to determine a movement but the determined movement is not used for further processing.

6. The optical navigation device according to claim 5, wherein said predetermined region includes a one-dimensional array extending at least partially through a horizontal or vertical direction of said image frame.

7. The optical navigation device according to claim 5, wherein a pixel is determined as a locally significantly different pixel when two pixels at two sides of said pixel are both brighter or both darker than said pixel.

* * * * *